United States Patent
Hirota et al.

(10) Patent No.: US 9,435,573 B2
(45) Date of Patent: Sep. 6, 2016

(54) ADSORPTION HEAT PUMP

(71) Applicant: KABUSHIKI KAISHA TOYOTA CHUO KENKYUSHO, Nagakute-shi, Aichi-ken (JP)

(72) Inventors: Yasuki Hirota, Seto (JP); Takafumi Yamauchi, Seto (JP); Ryuichi Iwata, Nagakute (JP); Takashi Shimazu, Nagoya (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 201 days.

(21) Appl. No.: 14/218,616

(22) Filed: Mar. 18, 2014

(65) Prior Publication Data
US 2014/0284026 A1 Sep. 25, 2014

(30) Foreign Application Priority Data
Mar. 21, 2013 (JP) .................................. 2013-058829

(51) Int. Cl.
F25D 23/00 (2006.01)
F25B 30/04 (2006.01)
F25B 17/08 (2006.01)

(52) U.S. Cl.
CPC ............. *F25B 30/04* (2013.01); *F25B 17/083* (2013.01); *F24D 2200/126* (2013.01); *Y02B 30/64* (2013.01)

(58) Field of Classification Search
CPC ........... F24F 3/1423; F24F 2203/1084; F25B 17/08; Y02B 30/62
USPC ................................. 62/271, 476, 480, 112
See application file for complete search history.

(56) References Cited

U.S. PATENT DOCUMENTS

| 5,628,205 A | * | 5/1997 | Rockenfeller | C09K 5/047 62/112 |
| 5,758,509 A | * | 6/1998 | Maeda | F24F 3/1411 62/333 |
| 5,761,925 A | * | 6/1998 | Maeda | F24F 3/1411 62/101 |

FOREIGN PATENT DOCUMENTS

| JP | H03-129266 A | 6/1991 |
| JP | 2000-179978 A | 6/2000 |
| JP | A-2002-178742 | 6/2002 |
| JP | 2012-127594 A | 7/2012 |

OTHER PUBLICATIONS

"Development of High Efficiency Kerosene Burning Appliances Employing Adsorption Heat Pumps," 24th *Technological Development/Research Results Presentation*, Jun. 2010, pp. 355-365, http://www.pecj.or.jp/japanese/report/2010report/24data/p512.pdf (with partial translation).
"Union Industry Adsorption Chillers—Principles of an Adsorption Chiller," http://www.union-reitouki.com/chiller/principle.html, retrieved on Nov. 22, 2012 (with translation).
Mar. 24, 2015 Office Action issued in Japanese Patent Application No. 2013-058829.

* cited by examiner

*Primary Examiner* — Melvin Jones
(74) *Attorney, Agent, or Firm* — Oliff PLC

(57) ABSTRACT

An adsorption heat pump includes: a first evaporator that evaporates a first fluid; a condenser that condenses the first fluid; a heater; and a rotary adsorption device. The rotary adsorption device includes: partitioning portions that radially partition a space encircling the rotation axis into plural regions, that each include a flow path for internally retaining and discharging a second fluid, and that each include an adsorbent on an outer surface thereof or on a wall surface of the flow path; and a pair of closure portions that close off both ends, in the direction of the rotation axis, of the plural regions. Each of the partitioning portions is moved alternately between the first evaporator side and the condenser side by rotation around the rotation axis. In the partitioning portions, retention and discharge of the first fluid, and discharge and retention of the second fluid, are repeated.

9 Claims, 7 Drawing Sheets

ADSORPTION HEAT PUMP

CROSS-REFERENCE TO RELATED APPLICATION

This application is based on and claims priority under 35 USC 119 from Japanese patent Application No. 2013-058829, filed Mar. 21, 2013, the disclosure of which is incorporated by reference herein.

TECHNICAL FIELD

The present invention relates to an adsorption heat pump.

BACKGROUND ART

As an example of an adsorption heat pump, adsorption heat pump hot water supply systems have been proposed, in which two adsorption devices are used. In this system, continuous driving is performed while switching between operation in which adsorption is performed in one adsorption device and desorption (regeneration) is performed in the other adsorption device, and operation in which desorption (regeneration) is performed in the one adsorption device and adsorption is performed in the other adsorption device (see, for example, "24$^{th}$ Technological Development/Research Results Presentation (P5.1.2) Development of High Efficiency Kerosene Burning Appliances Employing Adsorption Heat Pumps", (online), June 2010, Japan Petroleum Energy Center, (retrieved Nov. 22, 2012), internet <URL:http://www.pecj.or.jp/japanese/report/2010report/24data/p512.pdf>).

Moreover, as another example of an adsorption heat pump that performs switching between these two operations, adsorption refrigeration devices are known (see for example "Union Industry Adsorption Chillers—Principles of an Adsorption Chiller", (online), Union Industry Co., Ltd., (retrieved Nov. 22, 2012), internet <URL:http://www.union-reitouki.com/chiller/principle.html>, and Japanese Patent Application Laid-Open (JP-A) No. 2002-178742).

SUMMARY OF INVENTION

However, hitherto in adsorption heat pump hot water supply systems and adsorption refrigeration devices, switching between the two operations described above is performed by plural complex opening and closing operations to plural valves (ordinarily 4 switching valves).

A specific means to solve the above issue is as set out below.

Namely, an adsorption heat pump of the present invention includes:

a first evaporator that evaporates a first fluid;
a condenser that condenses the first fluid;
a heater; and
a rotary adsorption device that is provided so as to be rotatable around a rotation axis,
the rotary adsorption device including:
a plurality of partitioning portions that radially partition a space encircling the rotation axis into a plurality of regions, that each include a flow path for internally retaining a second fluid supplied from one end of the flow path in a direction parallel to a direction of the rotation axis and discharging the second fluid from the other end of the flow path, and that each include an adsorbent on an outer surface thereof or on a wall surface of the flow path, and at least one pair of closure portions that close off both ends, in the direction of the rotation axis, of the plurality of regions, but do not close off both ends of the flow path, wherein each of the plurality of partitioning portions is moved alternately between a first evaporator side and a condenser side by rotation of the rotary adsorption device around the rotation axis, the plurality of the partitioning portions include at least one first partitioning portion positioned at the first evaporator side and at least one second partitioning portion positioned at the condenser side, the first fluid supplied from the first evaporator is retained on an outer surface of the first partitioning portion, and the second fluid is discharged from the flow path of the first partitioning portion, the second fluid is retained in the flow path of the second partitioning portion, and the first fluid is discharged from an outer surface of the second partitioning portion and supplied to the condenser, and the heater heats the second fluid, and supplies the heated second fluid to the flow path of the second partitioning portion.

Description follows regarding the operation of the adsorption heat pump according to the invention, primarily focusing on a single given partitioning portion of the plural partitioning portions (referred to below as a "given partitioning portion"). Other partitioning portions may have the same configuration as that of the given partitioning portion.

In the invention, the given partitioning portion is moved alternately between the first evaporator side and the condenser side by rotation of the rotary adsorption device.

Events at Condenser Side

The following events occur in the given partitioning portion when the given partitioning portion is positioned at the condenser side.

At a point of time immediately after the given partitioning portion is moved to the condenser side (namely, before the events at the condenser side), the given partitioning portion is in a state in which the first fluid is retained at the outer surface of the given partitioning portion (see the description of the events at the first evaporator side described later).

First, heat from the heater (heat source) is supplied from one end (end at the heater side) of the flow path into the flow path inside the given partitioning portion due to the heated second fluid acting as a thermal energy transport medium.

When this occurs, the second fluid is suppressed from ingressing to the outer surface of the given partitioning portion. This is because the one end (end at the heater side) of the regions partitioned by the partitioning portions and the one end (end at the heater side) of the outer surface of the given partitioning portion are closed off by a closure portion.

The second fluid supplied to inside of the flow path is retained in the flow path, thereby heating the flow path. The heat is conducted to the outside of the given partitioning portion, and the first fluid is discharged from the outer surface of the partitioning portion due to the conducted heat.

Here "outer surface of the partitioning portion" indicates the adsorbent in cases in which an adsorbent is provided to the outer surface of the given partitioning portion (namely, to the exterior wall surface of the given partitioning portion; the same shall apply hereinafter) and indicates the exterior wall surface of the given partitioning portion in cases in which an adsorbent is not provided to the outer surface of the given partitioning portion.

Moreover, "the first fluid is discharged from the outer surface of the given partitioning portion" indicates the first fluid is desorbed from the adsorbent in cases in which an adsorbent is provided to the outer surface of the given partitioning portion, and indicates the first fluid is evaporated from the exterior wall surface in cases in which an adsorbent is not provided to the outer surface of the given partitioning portion.

Moreover, "the second fluid . . . is retained in the flow path" indicates that the second fluid is adsorbed by the adsorbent in cases in which an adsorbent is provided to the wall surface of the flow path, and indicates that the second fluid is condensed and retained in a liquid state on the wall surface of the flow path in cases in which an adsorbent is not provided to the wall surface of the flow path Next, the first fluid discharged from the outer surface of the given partitioning portion is supplied to the condenser, and condensed in the condenser. Heat (a hot thermal energy) is generated by the condensation.

Thus, as described above, at the condenser side, heat from the heater is supplied to the flow path inside the given partitioning portion by the second fluid acting as a thermal energy transport medium, and the supplied heat is then conducted to the outer surface of the given partitioning portion. The conducted heat is then transported to the condenser by the first fluid acting as a thermal energy transport medium, and the transported heat is supplied as a hot thermal energy.

In the given partitioning portion positioned at the condenser side, desorption of the first fluid from the adsorbent occurs in cases in which the adsorbent is provided at the outer surface, and adsorption of the second fluid to the adsorbent occurs in cases in which the adsorbent is provided to the wall surface of the flow path.

Events at First Evaporator Side

The following events occur when the given partitioning portion is positioned at the first evaporator side.

At a point of time immediately after the given partitioning portion is moved to the first evaporator side (namely, before the events at the first evaporator side), the given partitioning portion is in a state in which the first fluid has been discharged from the outer surface of the given partitioning portion (see the events at the condenser side described above). Namely, the outer surface is in a state capable of retaining the first fluid discharged from the first evaporator. This thereby promotes evaporation of the first fluid in the first evaporator.

A cold thermal energy is generated in the first evaporator due to the evaporation of the first fluid.

The first fluid evaporated from the first evaporator is retained at the outer surface of the given partitioning portion, and the given partitioning portion is thereby heated.

Here, "the first fluid . . . is retained at the outer surface of the given partitioning portion" indicates that the first fluid is adsorbed by the adsorbent in cases in which the adsorbent is provided to the outer surface of the given partitioning portion, and indicates that the first fluid is condensed on the exterior wall surface of the given partitioning portion in cases in which an adsorbent is not provided to the outer surface of the given partitioning portion.

Next, heat from the above heating is conducted to the flow path inside the given partitioning portion, and the second fluid retained in the flow path (see the events at the condenser side described above) is discharged from the other end (end at a side further from the heater) of the flow path due to the conducted heat.

Here, "the second fluid . . . is discharged . . . from the other end of the flow path" indicates that the second fluid is desorbed from the adsorbent in cases in which an adsorbent is provided to the wall surface of the flow path, and indicates that the second fluid retained in a liquid state is evaporated and detached from the wall surface of the flow path in cases in which an adsorbent is not provided to the wall surface of the flow path.

When this occurs, retention of the first fluid at the outer surface of the given partitioning portion is promoted. This is because the other end (end at a side further from the heater) of the regions partitioned by the partitioning portions and the other end (end at a side further from the heater) of the outer surface of the given partitioning portion are closed off by a closure portion.

Thus as described above, at the first evaporator side, heat is supplied to the outer surface of the given partitioning portion by the first fluid acting as a thermal energy transport medium, and the supplied heat is conducted to the flow path inside the given partitioning portion. The conducted heat is discharged from the flow path by the second fluid acting as a thermal energy transport medium. In the first evaporator, a cold thermal energy is generated due to the evaporation of the first fluid, and the cold thermal energy is utilized.

When the given partitioning portion is positioned at the first evaporator side, adsorption of the first fluid to the adsorbent occurs in cases in which the adsorbent is provided to the outer surface, and desorption of the second fluid from the adsorbent occurs in cases in which the adsorbent is provided to the wall surface of the flow path.

In the given partitioning portion, switching between the events at the condenser side and the events at the first evaporator side is made by rotation of the rotary adsorption device, and these two modes of events are performed repeatedly.

In the invention it is accordingly possible, as described above, in the given partitioning portion to switch between adsorption in the adsorbent (adsorption is an event that occurs at the first evaporator side in cases in which the adsorbent is provided to the outer surface of the partitioning portion, and occurs at the condenser side in cases in which the adsorbent is provided to the wall surface of the flow path), and desorption from the adsorbent (desorption is an event that occurs at the condenser side in cases in which an adsorbent is provided to the outer surface of the partitioning portion, and occurs at the first evaporator side in cases in which the adsorbent is provided to the wall surface of the flow path), by a simple operation that is rotation of the rotary adsorption device, rather than by a complicated opening and closing operation of plural valves. This configuration enables continuous operation in the given partitioning portion, and therefore provides excellent heat utilization efficiency.

Moreover, in the invention, two or more of partitioning portions having the above-described configuration are provided over the entire space surrounding the rotation axis of the rotary adsorption device, and, therefore, the events at the condenser side and the events at the first evaporator side are performed at the same time when the adsorption heat pump is considered as a whole. Therefore, when considering the whole adsorption heat pump, since a hot thermal energy can be obtained in the condenser and, at the same time, a cold thermal energy can be obtained in the first evaporator based on heat supplied from the heater (heat source), excellent heat utilization efficiency can be achieved.

As described above, according to the adsorption heat pump according to the invention, switching between adsorption to, and desorption from, the adsorbent can be performed by a simple method that is rotation of the rotary adsorption device, enabling heat utilization efficiency to be enhanced.

In a preferable embodiment of the adsorption heat pump according to the invention, the plural partitioning portions include an adsorbent for performing adsorption and desorption of the first fluid at the outer surface of the partitioning portion, the first fluid supplied from the first evaporator is adsorbed and retained by the adsorbent at the outer surface of at least one partitioning portion positioned at the first evaporator side, the second fluid is evaporated inside the flow path of the at least one partitioning portion positioned at the first evaporator side and discharged from the flow path, the second fluid supplied from the heater is condensed and retained on the wall surface of the flow path of at least one partitioning portion positioned at the condenser side, and the first fluid is desorbed and discharged from the adsorbent at the outer surface of the at least one partitioning portion positioned at the condenser side.

According to this preferable embodiment, more efficient heat transport between the adsorbent provided to the outer surface of the partitioning portion and the first evaporators can be achieved through the evaporation and adsorption of the first fluid, and more efficient heat transport between the adsorbent and the condenser can be achieved through the desorption and condensation of the first fluid.

Moreover, in this preferable embodiment, switching between the adsorption and desorption of the first fluid (adsorbate) by the adsorbent is performed using a condensation heat (latent heat) and evaporation heat (latent heat) of the second fluid at the wall surface of the flow path, rather than by conventional methods in which switching is performed using a temperature change (sensible heat) of the second fluid in a liquid state.

Specifically, in this preferable embodiment, the second fluid is evaporated in the flow path of at least one partitioning portion positioned at the first evaporator side, and the adsorbent at the outer surface of the at least one partitioning portion positioned at the first evaporator side is cooled (hereinafter also referred to as "latent heat cooling") by evaporation heat used during the evaporation, thereby promoting the adsorption of the first fluid to the adsorbent. Moreover, the second fluid condenses in the flow path of at least one partitioning portion positioned at the condenser side, and the adsorbent at the outer surface of the at least one partitioning portion positioned at the condenser side is heated by condensation heat generated during the condensation (hereinafter also referred to as "latent heat heating"), thereby promoting the desorption of the first fluid from the adsorbent.

Accordingly, according to this preferable embodiment, sensible heat loss can be reduced compared to methods that use a change in the temperature (sensible heat) of the second fluid in a liquid state.

For example, in a case in which this preferable embodiment is modified such that switching between adsorption reaction and desorption reaction in the adsorbent is switched by changing the temperature of a liquid as the second fluid, there is a loss corresponding to the sensible heat (a sensible heat loss) of the liquid (the second fluid) contained in the flow path at the time of switching.

Moreover, according to this preferable embodiment, it is possible to reduce the amount of the second fluid used to perform adsorption and desorption of the first liquid, compared to methods that use a change in the temperature of the second fluid in a liquid state (sensible heat) therefor.

Moreover, this preferable embodiment also has excellent heat transfer efficiency, compared to methods that use a change in the temperature of the second fluid in a liquid state (sensible heat).

In the adsorption heat pump according to the invention, the first fluid and the second fluid are preferably the same substance.

When the first fluid and the second fluid are the same substance, problems associated with sealing performance between the flow paths through which the second fluid flows and the space through which the first fluid flows (the space between the rotary adsorption device and the first evaporator, and the space between the rotary adsorption device and the condenser) can be alleviated.

Moreover, in cases in which a configuration in which the second fluid discharged from the flow paths condenses in the condenser is adopted, fluctuation of fluid composition caused by mixing of the first fluid and the second fluid in the condenser is suppressed by using the same substance for the first and second fluids.

In the adsorption heat pump according to the invention, the condenser preferably condenses the second fluid discharged from the flow paths.

In a case in which the second fluid discharged from the flow paths is condensed in the condenser, heat generated by the condensation of the second fluid as well as the heat generated by condensation of the first fluid can be obtained in the condenser, and heat utilization efficiency can therefore be further enhanced.

The adsorption heat pump according to the invention preferably further includes a housing body for housing the rotary adsorption device, the first evaporator, and the condenser.

By providing the housing body, the transfer of the first fluid from the first evaporator to the rotary adsorption device, and the transfer of the first liquid from the rotary adsorption device to the condenser, can be performed within a closed space, thereby further enhancing heat transport efficiency.

In the adsorption heat pump according to the invention, the heater is preferably a second evaporator that evaporates the second fluid and supplies the second fluid in a gaseous state into the flow path.

By using this second evaporator, the quantity of heat supplied to the flow path by the second fluid acting as a thermal energy transport medium can more easily be controlled.

The adsorption heat pump according to the invention preferably further includes a blocking portion that blocks the other end side (a side further from the heater) of the flow path of at least one partitioning portion positioned at the condenser side.

By providing the blocking portion, the occurrence of a phenomenon in which the second fluid supplied from the one end (end at the heater side) of the flow paths escapes from the other end (end at a side further from the heater) of the flow paths can be suppressed, and the efficiency with which the second fluid is retained in the flow paths can therefore be further enhanced.

In the adsorption heat pump according to the invention, each of the first fluid and the second fluid is preferably at least one of water or ammonia, (i.e., water, or ammonia, or a mixture of water and ammonia).

Since the latent heats of both water and ammonia are large, use of the above-specified fluid substance further enhances the heat utilization efficiency. Moreover, heating based on latent heat and cooling based on latent heat can more effectively be performed by using the above-specified fluid substance.

In the adsorption heat pump according to the invention, the adsorbent is at least one selected from the group consisting of activated carbon, mesoporous silica, zeolite, silica gel, and a clay mineral.

By using the above-specified adsorbent substance, adsorption and desorption in the adsorbent can be performed more effectively.

According to the invention, switching between adsorption and desorption in an adsorbent can be performed using a simple method, and an adsorption heat pump having excellent heat utilization efficiency can be provided.

DETAILED DESCRIPTION OF INVENTION

Figure 1:
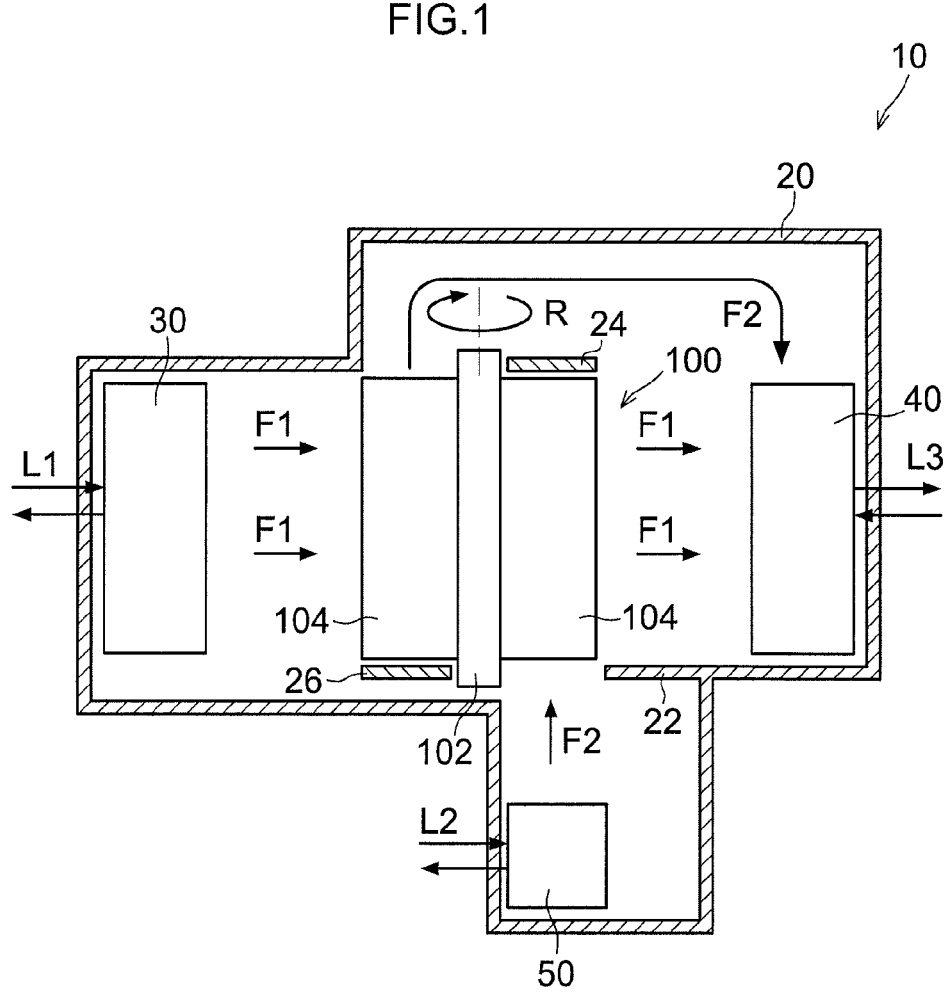
FIG. 1 is a schematic configuration diagram of an adsorption heat pump according to the present embodiment.

Description is given below regarding an adsorption heat pump according to an embodiment according to the invention with reference to the drawings. However, the invention is not limited to the embodiments below. Note that throughout the drawings, members that have substantially the same functions are designated by the same reference numerals throughout the drawings, and description thereof may be omitted.

Figure 2:
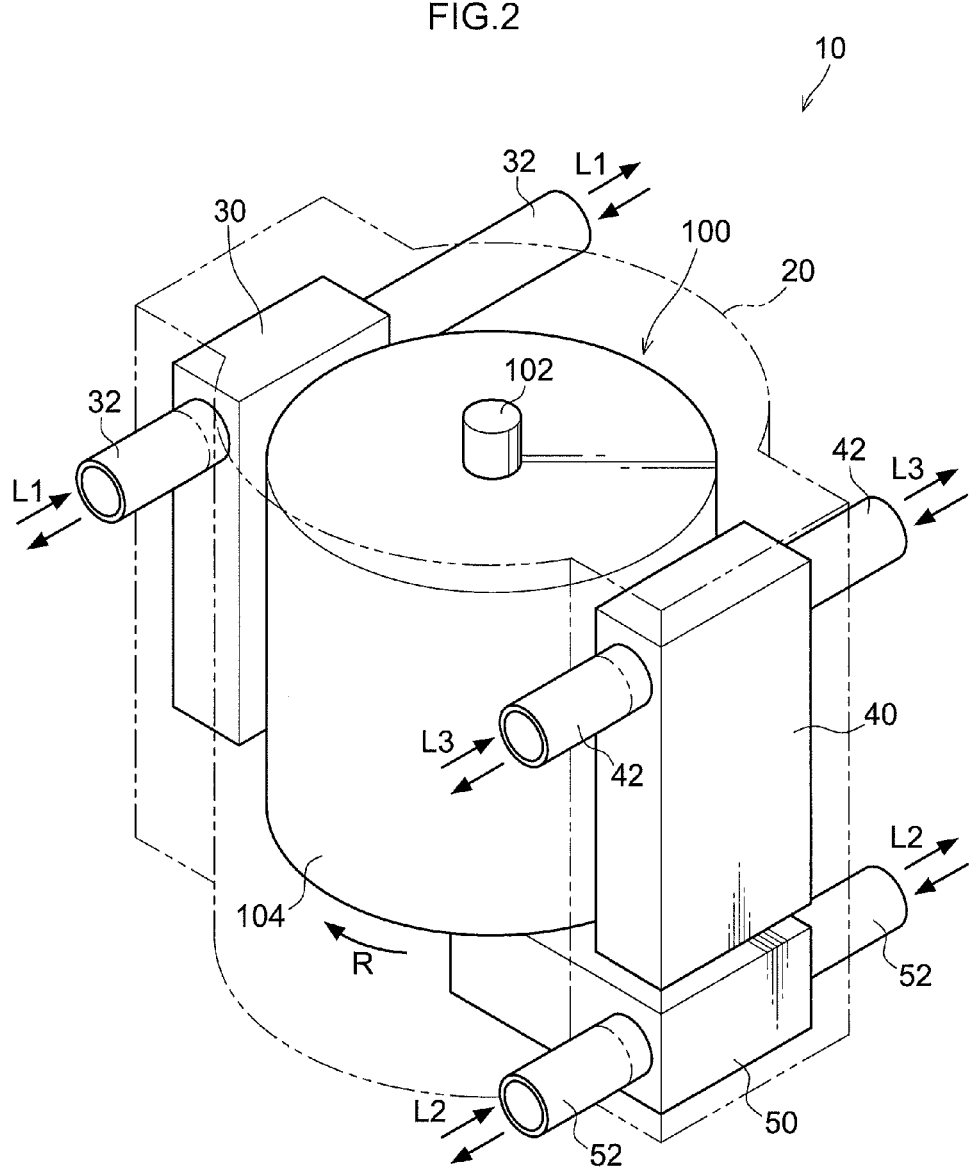
FIG. 2 is a schematic perspective view of the adsorption heat pump according to the present embodiment.
Figure 3:
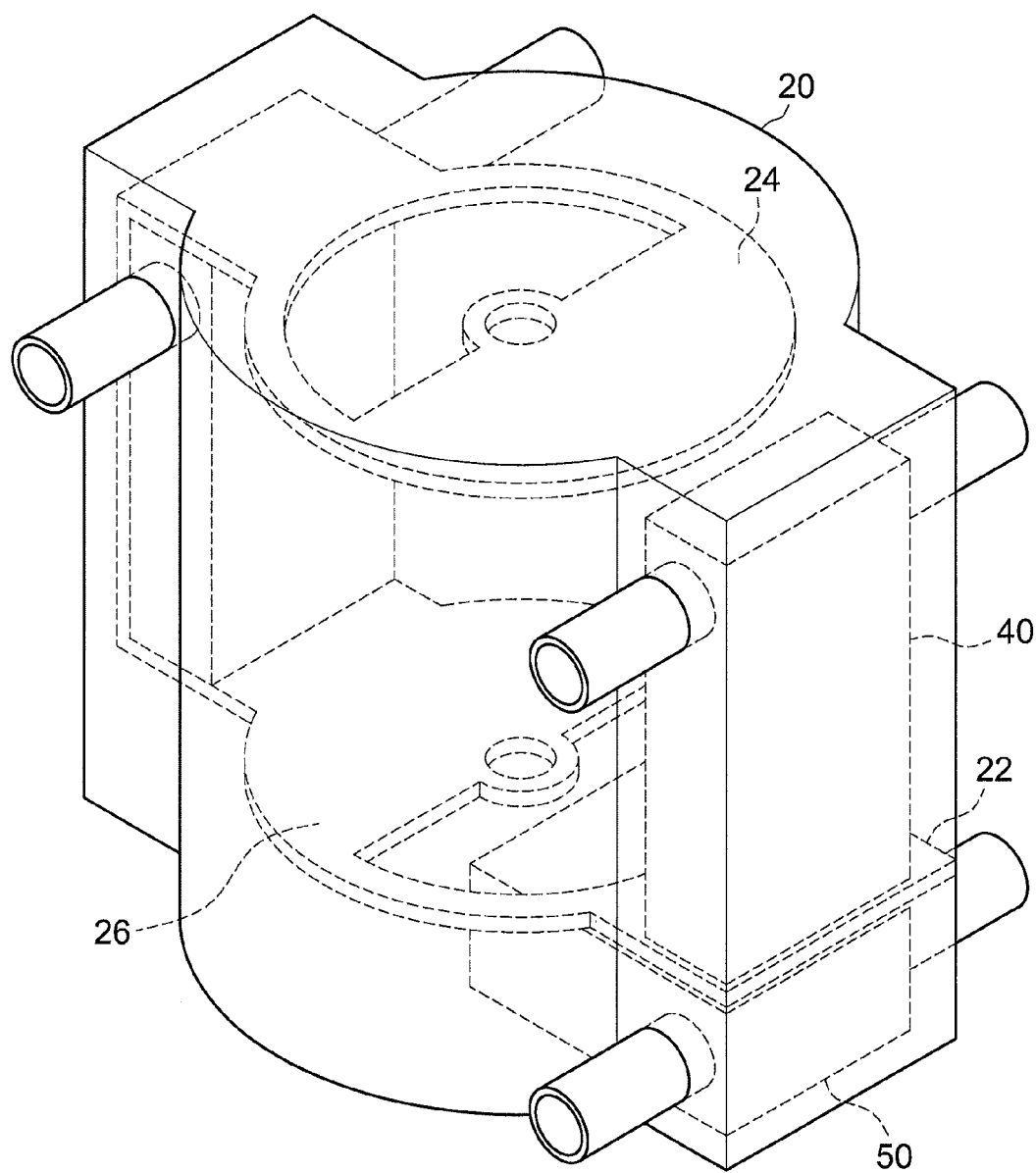
FIG. 3 is a schematic perspective view of portions other than a rotary adsorption device of the adsorption heat pump according to the present embodiment.

FIG. 1 is a schematic configuration diagram of an adsorption heat pump according to the present embodiment. FIG. 2 is a schematic perspective view of the adsorption heat pump according to the present embodiment. FIG. 3 is a schematic perspective view of portions, other than a rotary adsorption device, of the adsorption heat pump according to the present embodiment.

As illustrated in FIG. 1 and FIG. 2, the adsorption heat pump 10 according to the present embodiment includes, in a space inside a housing body 20: a first evaporator 30, a condenser 40, and a rotary adsorption device 100 provided between the first evaporator 30 and the condenser 40.

The first evaporator 30 and the condenser 40 are disposed at fixed positions inside the housing body 20, whereas the rotary adsorption device 100 is provided so as to be rotatable around a rotation shaft 102. The rotary adsorption device 100 is disposed such that a peripheral portion 104 disposed around a rotation shaft 102 faces the first evaporator 30 and the condenser 40.

Figure 4:
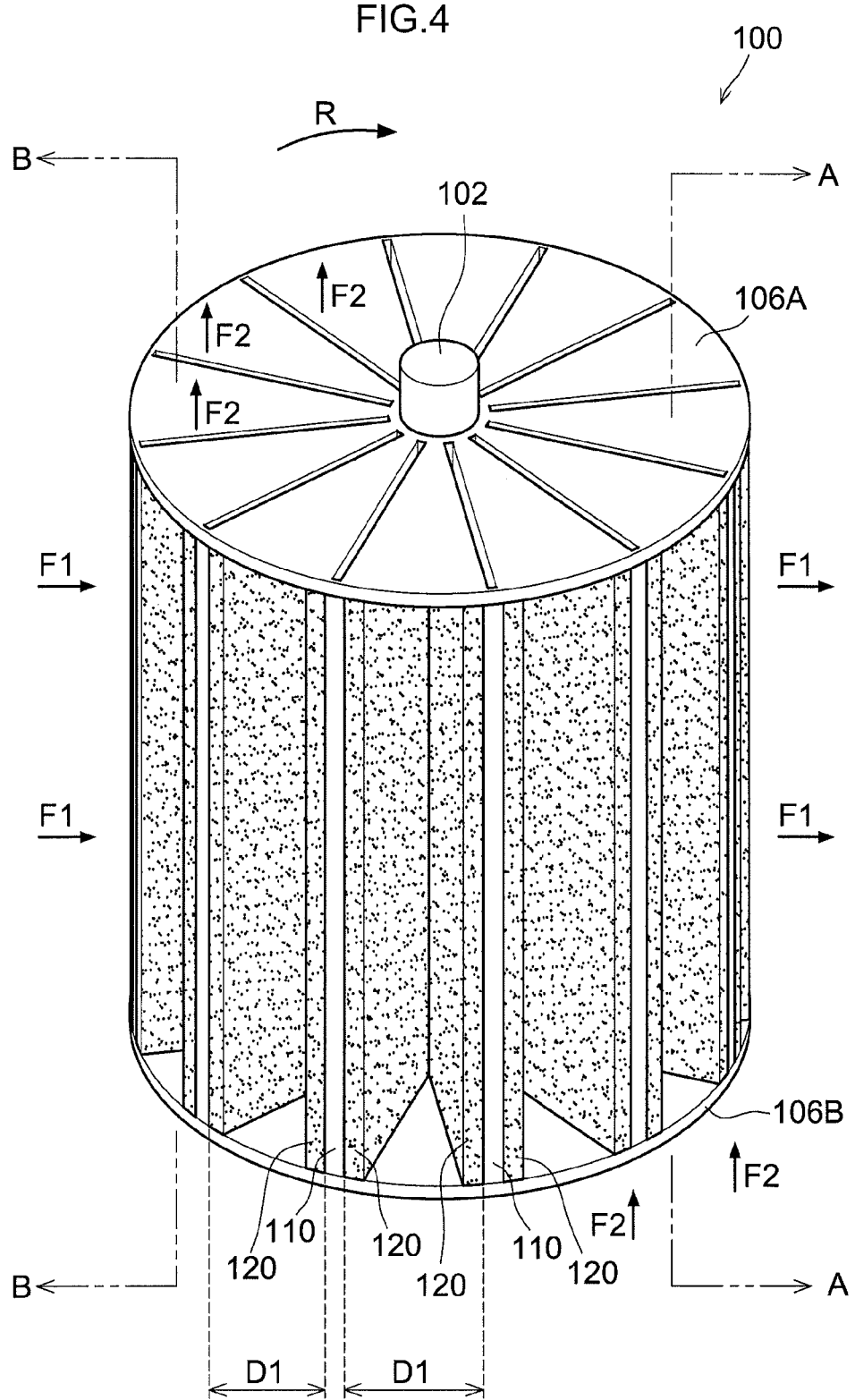
FIG. 4 is a schematic perspective view of the rotary adsorption device according to the present embodiment.

The peripheral portion 104 is configured by plural regions D1, plural partitioning portions 110, plural adsorbent layers 120, a closure portion 106A, and a closure portion 106B, as illustrated in FIG. 4 described below.

In the adsorption heat pump 10, a first fluid F1 evaporated by the first evaporator 30 is transported to a first evaporator 30 side of the peripheral portion 104 (more specifically, at least one of the after-mentioned adsorbent layers 120 present at this side) and retained in this side, and the first fluid F1 detached from a condenser 40 side of the peripheral portion 104 (more specifically, from at least one of the adsorbent layers 120 present at this side) is transported to the condenser 40, and condensed by the condenser 40. These events occur with rotation of the rotary adsorption device 100.

The direction of rotation of the rotary adsorption device 100 is indicated in FIG. 1 and FIG. 2 by an arrow R. The rotation direction of the rotary adsorption device 100 may be the opposite direction from that illustrated in FIG. 1 and FIG. 2.

The first fluid F1 in the present embodiment is a mobile medium that transports heat by moving between the rotary adsorption device 100 and the first evaporator 30 and between the rotary adsorption device 100 and the condenser 40.

From the point of view of high latent heat, the first fluid F1 is preferably at least one of water or ammonia (i.e., water, ammonia, or a mixture of water and ammonia), and water is particularly preferable.

Moreover, a second fluid F2 in the present embodiment is a heat exchange fluid that performs heat exchange between the inside of flow paths 112 and the outer surfaces of partitioning portions 110 (the adsorbent layer 120 in the present embodiment) by being retained in the flow paths 112 or detached from the flow paths 112.

From the point of view of high latent heat, the second fluid F2 is preferably at least one of water or ammonia (i.e, water, ammonia, or a mixture of water and ammonia), and water is particularly preferable.

Moreover, it is preferable that the first fluid F1 and the second fluid F2 are the same substance, as described below.

The adsorption heat pump 10 also includes a second evaporator 50 that evaporates the second fluid F2.

The second evaporator 50 is disposed at a fixed position so as to face one end side, in a direction parallel to the direction of the rotation shaft 102 (hereinafter also referred to as the "axial direction"), of a part of the peripheral portion 104 of the rotary adsorption device 100 at the condenser 40 side. With the second evaporator 50 being disposed in this manner, the second fluid F2 can be supplied to the one end side (more specifically, to inside the flow paths 112 described below), and heat can be supplied by the second fluid F2 serving as a thetinal energy transport medium.

Inside the housing body 20, the space in which the second evaporator 50 is disposed and the space in which the condenser 40 is disposed are separated by a partitioning wall 22 disposed at a fixed position inside the housing body 20, and by the rotary adsorption device 100. Description regarding the partitioning wall 22 is given later.

A heater (heat source), other than the second evaporator 50 according to the present embodiment, that heats the second fluid F2 and supplies the heated second fluid F2 may be used in the invention. Examples of heaters other than the second evaporator 50 include a heater that heats and supplies a second fluid F2 (for example, ammonia) already in a gaseous state.

Moreover, a blocking portion 24 is provided so as to face the other end in the axial direction (end at the opposite side from a side at which the second evaporator 50 is present) of the part of the peripheral portion 104 of the rotary adsorption device 100 at the condenser 40 side. The blocking portion 24 is disposed at a fixed position inside the housing body 20. Namely, when the rotary adsorption device 100 rotates, the blocking portion 24 does not rotate (move) with the rotary adsorption device 100.

Providing the blocking portion 24 enables better suppression of escape from the other end side of the second fluid F2, which has been supplied from the second evaporator 50 to the peripheral portion 104 (more specifically, to the flow paths 112 described below). Description regarding the blocking portion 24 is given later.

Moreover, a blocking portion 26 is provided to face the one end in the axial direction (end at the opposite side from a side closer to the second evaporator 50) of a part of the peripheral portion 104 of the rotary adsorption device 100 that faces the first evaporator 30. The blocking portion 26 is also disposed at a fixed position inside the housing body 20. Namely, when the rotary adsorption device 100 rotates, the blocking portion 26 does not rotate (move) with the rotation of the rotary adsorption device 100.

Provision of the blocking portion 26 enables more efficient discharge of the second fluid F2 from the other end side of the peripheral portion 104 (more specifically, of the flow paths 112 described later). Description regarding the blocking portion 26 is given later.

Explanation next follows regarding the rotary adsorption device 100.

FIG. 4 is a schematic perspective view of the rotary adsorption device 100. As illustrated in FIG. 4, the rotary adsorption device 100 includes the rotation shaft 102, and the plural partitioning portions 110 that radially partition a space encircling the rotation shaft 102 into plural regions D1.

In FIG. 4, not all of the regions, all of the partitioning portions, or all of the adsorbent layers are appended with reference numerals, but only some of the regions, the partitioning portions, or the adsorbent layers are appended with reference numerals D1, 110, and 120, respectively, for the purpose of simple illustration. Moreover, in FIG. 4, the line A-A side is the condenser 40 side, and the line B-B side is the first evaporator 30 side.

Figure 5:
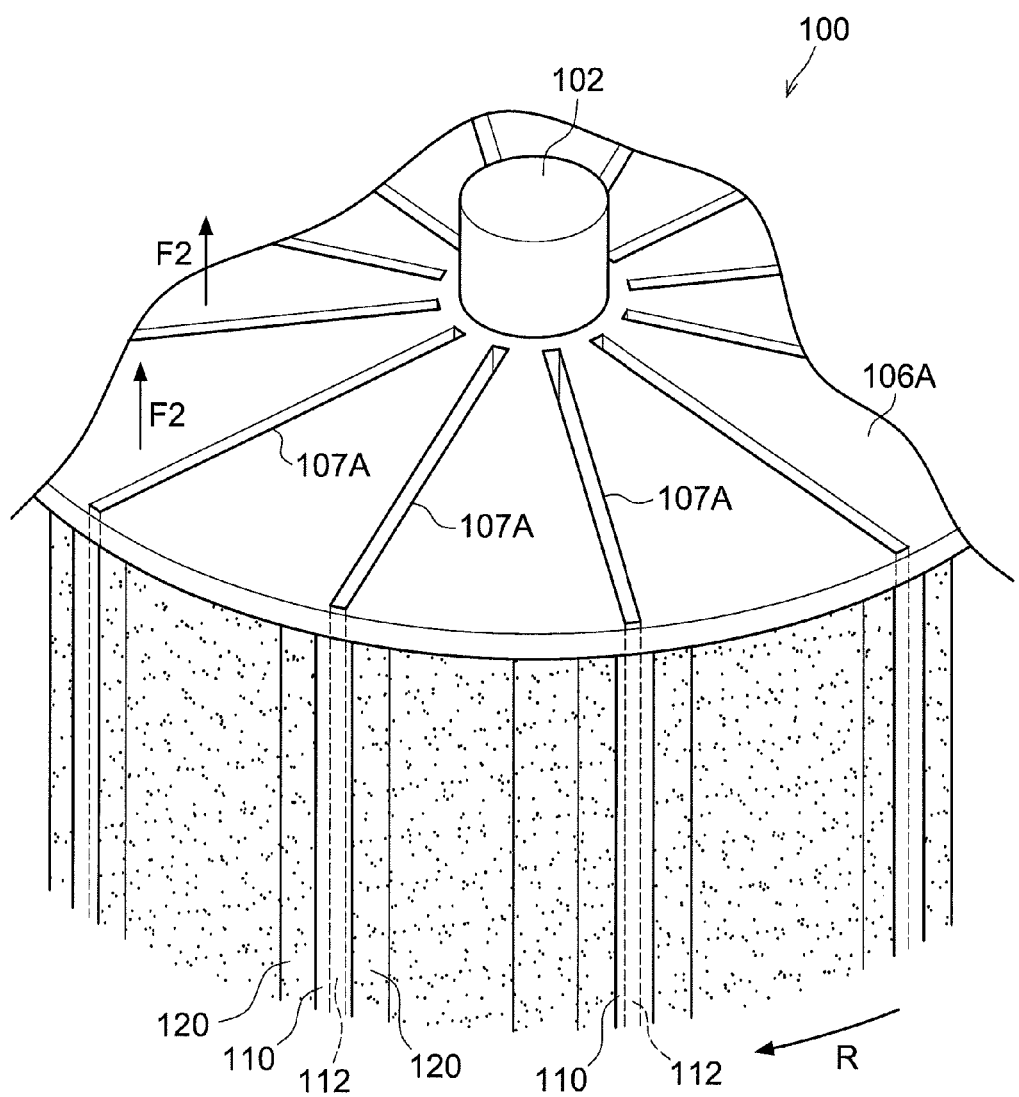
FIG. 5 is a schematic perspective view of an enlargement of a portion of the rotary adsorption device according to the present embodiment.

FIG. 5 is a schematic perspective view of an enlargement of a portion of the rotary adsorption device 100 illustrated in FIG. 4.

Figure 6:
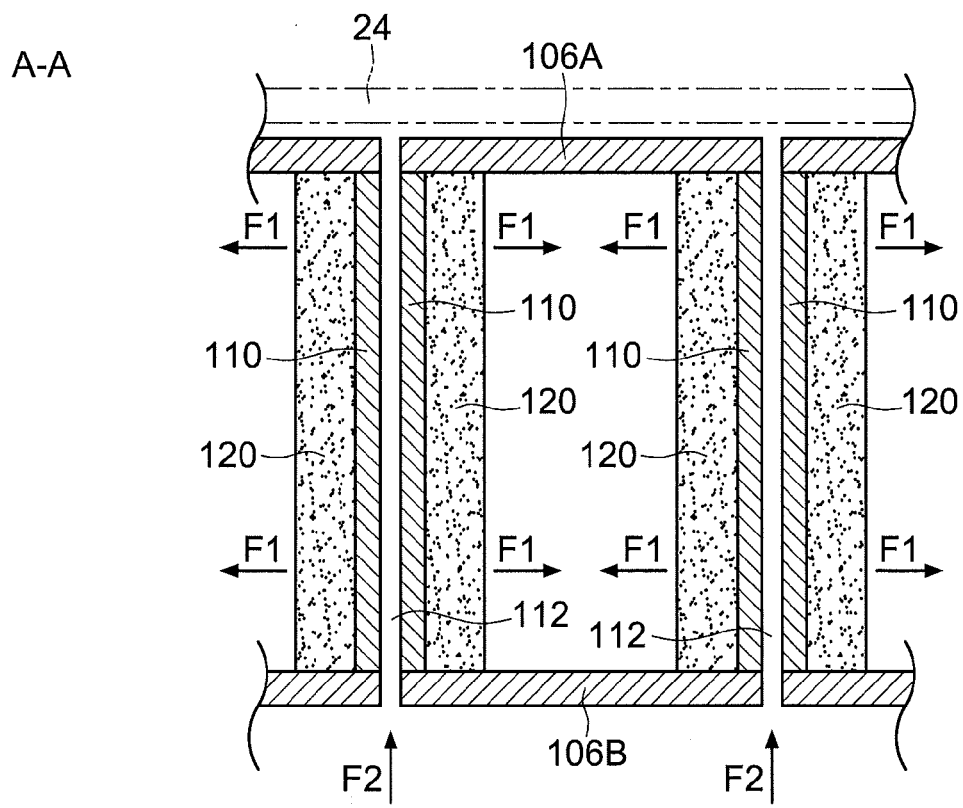
FIG. 6 is a schematic view (a cross-sectional view taken along line A-A in FIG. 4) illustrating a cross-section of a peripheral portion of the rotary adsorption device positioned at a condenser side in the present embodiment.

FIG. 6 is a schematic view illustrating a cross-section of a part of the peripheral portion 104 positioned at the condenser 40 side and the transfer of the first fluid F1 and the second fluid F2, and FIG. 6 corresponds to a cross-sectional view taken along the line A-A in FIG. 4.

Figure 7:
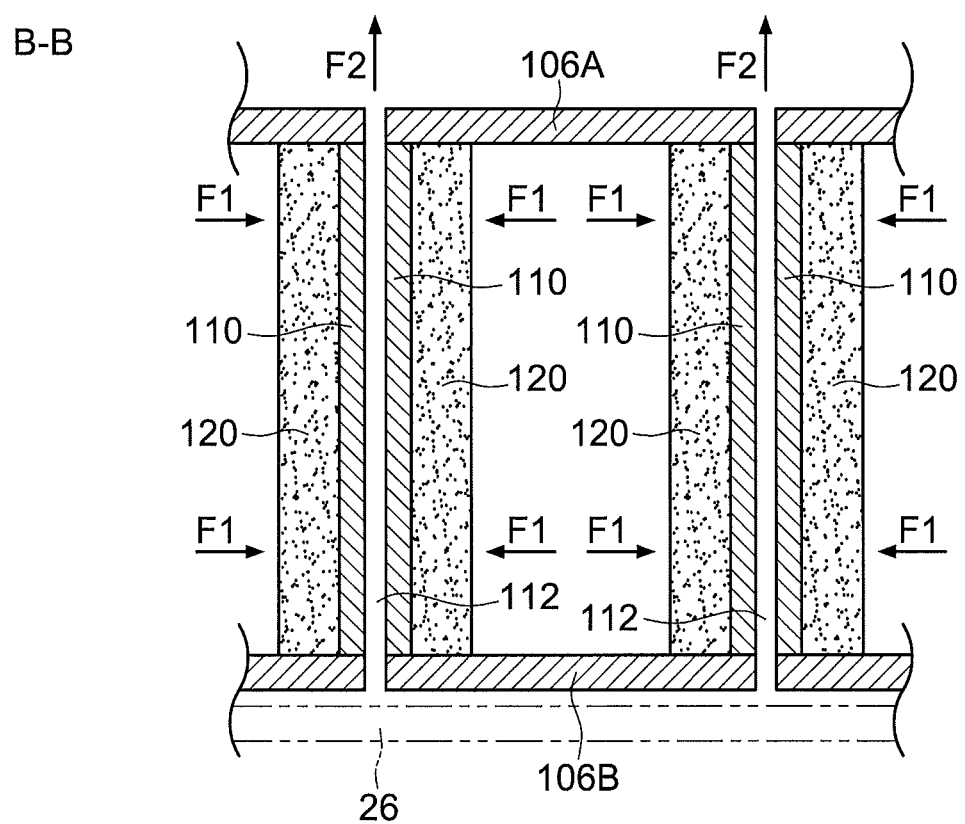
FIG. 7 is a schematic view (a cross-sectional view taken along line B-B in FIG. 4) illustrating a cross-section of a peripheral portion of the rotary adsorption device positioned at a first evaporator side in the present embodiment.

FIG. 7 is a schematic view illustrating a cross-section of a part of the peripheral portion 104 positioned at the first evaporator 30 side and the transfer of the first fluid F1 and the second fluid F2, and corresponds to a cross-sectional view taken along the line B-B in FIG. 4.

Each of FIG. 6 and FIG. 7 is a cross-section of the peripheral portion 104 sectioned along a plane defined by the axial direction and a radial direction.

As illustrated in FIG. 5 to FIG. 7, the flow paths 112 are provided inside the partitioning portions 110. The flow paths 112 pass along the axial direction through the partitioning portions 110.

In the present embodiment, the partitioning portions 110 are flat-plate-shaped members with their thickness directions along the circumferential direction of the rotary adsorption device 100, and the flow paths 112 are flat-plate-shaped spaces with their thickness directions along the circumferential direction of the rotary adsorption device 100.

The second fluid F2 supplied from the one end side in the axial direction (the second evaporator 50 side) of the flow paths 112 is retained inside the flow paths 112, and the retained second fluid F2 is detached and discharged from the other end side.

Specifically, when flow paths 112 are positioned at the condenser 40 side, the second fluid F2 in a gaseous state emitted from the second evaporator 50 enters the flow paths 112 (see FIG. 6), and the second fluid F2 that has entered the flow paths 112 is then condensed and retained in a liquid state on wall surfaces of the flow paths 112. When the flow paths 112 are positioned at the first evaporator 30 side, the second fluid F2 that has been retained in a liquid state on the wall surfaces of the flow paths 112 is evaporated and discharged from the other end side (side further from the second evaporator 50) (see FIG. 7).

The wall surfaces of the flow paths 112 preferably have a structure that facilitates retention of the second fluid F2 in the liquid state.

The wall surfaces of the flow paths 112 preferably have, in at least a part thereof, a gutter portion (for example, a groove structure with a grooved or depression shape, or a wick structure that exhibits capillary action, such as a mesh), for example. When the wall surfaces of the flow paths 112 have the gutter portions, the second fluid F2 can easily be retained on the wall surfaces by surface tension.

Examples of preferable materials for the partitioning portions 110 include materials having a high thermal conductivity and corrosion resistance towards the first fluid F1 and the second fluid F2, such as a metal (examples thereof including stainless steel, aluminum, and aluminum alloys).

The material for the rotation shaft 102 is not particularly limited, and may be, for example, a material selected from the materials mentioned as examples of the material of the partitioning portions 110. The material of the rotation shaft 102 may be the same as that of the partitioning portions 110.

Moreover, as illustrated in FIG. 4 to FIG. 7, an adsorbent layer 120 that includes the adsorbent is provided at the outer surface (exterior wall surface) of each partitioning portion 110. The adsorbent included in the adsorbent layer 120 (hereinafter also referred to as "adsorbent layer 120" for convenience) performs adsorption and desorption of the first fluid F1 discharged in a gaseous state from the first evaporator 30.

Specifically, when the adsorbent layer 120 is positioned at the first evaporator 30 side, the first fluid F1 discharged in a gaseous state from the first evaporator 30 is adsorbed by the adsorbent layer 120 (see FIG. 7). Further, when the adsorbent layer 120 is positioned at the condenser 40 side, the adsorbed (retained) first fluid F1 is desorbed (see FIG. 6). The desorbed first fluid F1 is transported to the condenser 40, and condensed in the condenser 40. A preferable mode of the adsorbent layer 120 is described later.

As illustrated in FIG. 4 and FIG. 5, the rotary adsorption device 100 further includes a pair of closure portions (a closure portion 106A and a closure portion 106B) that close off both ends in the rotation axis direction of each of the regions D1. The closure portion 106A and the closure portion 106B have open portions (for example, open portions 107A in FIG. 5) at positions corresponding to both ends of each flow path 112.

According to this configuration, the second fluid F2 is suppressed from entering into the regions D1 (in particular, the adsorbent layer 120 present in the regions D1) when the second fluid F2 enters/leaves the flow paths 112

In the present embodiment, both ends of all of the regions D1 are closed by a single closure portion 106A and a single closure portion 106B; however, the invention is not limited to such a mode. For example, each of the single closure portion 106A and the single closure portion 106B may be divided into plural members. Moreover, a mode in which a pair of closure portions that close both ends of a single region D1 is provided for each region D1 individually may be applied.

In FIG. 4 and FIG. 5, a space encircling the rotation shaft 102 is partitioned into twelve regions D1 (partitioned into twelve parts) by twelve partitioning portions 110; however, the invention is not limited to twelve partitions.

The number of the partitioning portions 110 (namely, the number of the regions D1) may be, for example, from 4 to 60, and preferably from 20 to 40.

The greater the number of the regions D1 (namely, the number of partitions), the greater the total surface area of the adsorbent layers 120. Therefore, a greater number of the regions D1 is more preferable from the point of view of adsorption/desorption performance.

In the present embodiment, description has been given of a case in which, for convenience, the rotation shaft 102, the partitioning portions 110, the closure portion 106A, and the closure portion 106B are configured as independent members; however, it is not necessary for these members to be independent members, and two or more of these members may be integrated together.

The rotation of the rotary adsorption device 100 may be performed automatically using a driving device such as a motor, or performed manually in consideration of such factors as the adsorption capacity.

The rotation of the rotary adsorption device 100 may be a continuous rotation or an intermittent rotation.

The rotation speed of the rotary adsorption device 100 is not particularly limited, and is appropriately set in consideration of such factors as the adsorption/desorption rate of the first fluid F1 by the adsorbent layer 120. The rotation speed may, for example, be from 0.2 rpm to 2.0 rpm, and is preferably from 0.5 rpm to 1.0 rpm.

Next, returning to FIG. 1 to FIG. 3, explanation follows regarding components such as the first evaporator 30, the condenser 40, the second evaporator 50, and the housing body 20.

The first evaporator 30 evaporates the first fluid F1 inside thereof, and supplies the first fluid F1 in a gaseous state to the peripheral portion 104 of the rotary adsorption device 100.

Known evaporators may be used as the first evaporator 30. An evaporator for use as the first evaporator 30 preferably has a configuration in which the first fluid F1 can be discharged from a face that faces the peripheral portion 104.

As illustrated in FIG. 2 and FIG. 3, a pipe 32 for exchanging heat medium L1 between the first evaporator 30 and a unit which is located outside the adsorption heat pump 10 and at which cold thermal energy is to be utilized is provided to the first evaporator 30. In the first evaporator 30, a cold thermal energy arising due to evaporation of the first fluid F1 is transported to a unit at which the cold thermal energy is to be utilized via the heat medium L1 acting as a thermal energy transport medium.

The condenser 40 internally condenses the first fluid F1 that has been transported in a gaseous state from the peripheral portion 104 of the rotary adsorption device 100. Known condensers may be used as the condenser 40, and a condenser for use as the condenser 40 preferably has a configuration capable of incorporating the first fluid F1 in a gaseous state from a face of the condenser that faces the peripheral portion 104.

As illustrated in FIG. 2 and FIG. 3, a pipe 42 for exchanging heat medium L3 between the condenser 40 and a unit which is located outside the adsorption heat pump 10 and at which hot thermal energy is utilized is provided to the condenser 40. A hot thermal energy arising due to the condensation of the first fluid F1 (preferably the first fluid F1 and the second fluid F2) in the condenser 40 is transported to the unit located outside the adsorption heat pump 10 and at which hot thermal energy is utilized, via the heat medium L3 acting as a thermal energy transport medium.

Furthermore, the condenser 40 preferably internally condensates, in addition to the first fluid F1, the second fluid F2 that has been discharged from the other end (end further from the second condenser 50) of flow paths 112 when the flow paths 112 are positioned at the first evaporator 30 side. With this configuration, the heat generated from the condensation of the second fluid F2 can be obtained in the condenser 40 in addition to the heat generated from the condensation of the first fluid F1, and heat utilization efficiency is therefore further enhanced.

In the adsorption heat pump 10 according to the present embodiment, a transport device (not illustrated) for transporting the first fluid F1 from the condenser 40 toward the first evaporator 30 is preferably provided. The provision of the transport device enables an amount of the first fluid F1 lost by evaporation in the first evaporator 30 to be re-supplied from the condenser 40.

The second evaporator 50 receives heat from a heat source located outside the adsorption heat pump 10, such as vent, and internally evaporates the second fluid F2, and supplies the second fluid F2 to the peripheral portion 104 (more specifically, the one end (end closer to the second evaporator 50) of flow paths 112 positioned at the condenser 40 side) of the rotary adsorption device 100.

Known evaporators may be used as the second evaporator 50. An evaporator for use as the second evaporator 50 preferably has a configuration capable of discharging the second fluid F2 in a gaseous state from a face of the evaporator that faces the peripheral portion 104 is preferable.

Moreover, as illustrated in FIG. 2 and FIG. 3, a pipe 52 for exchanging a heat medium L2 between the second evaporator 50 and a heat source located outside the adsorption heat pump 10 is provided to the second evaporator 50. Heat from a heat source (such as vent heat) is supplied to the second evaporator 50 via the heat medium L2 acting as a thermal energy transport medium.

In the present embodiment, a fluid commonly used as a heat medium, such as an alcohol, such as ethanol, water, an oil, or a mixture thereof, may be used as the heat medium L1, the heat medium L2, and the heat medium L3.

A transport device (not illustrated) that transports the first fluid F1 from the condenser 40 toward the second evaporator 50 is preferably provided to the adsorption heat pump 10 according to the present embodiment in cases in which the first fluid F1 and the second fluid F2 are the same substance as each other. The provision of the transport device enables an amount of the second fluid F2 (namely, the first fluid F1) lost by evaporation in the second evaporator 50 to be re-supplied from the condenser 40.

Moreover, the first evaporator 30, the rotary adsorption device 100, and the condenser 40 are housed in the interior space of the housing body 20. When the housing body 20 is provided, the transfer of the first fluid F1 from the first evaporator 30 to the rotary adsorption device 100, and the transfer of the first fluid F1 from the rotary adsorption device 100 to the condenser 40, can be performed within a closed space, as a result of which the heat transport efficiency further improves.

In the present embodiment, the second evaporator 50 is also disposed in the housing body 20, and the space at which the second evaporator 50 is disposed and the space at which the condenser 40 is disposed are separated by the partitioning wall 22 and the rotary adsorption device 100.

The second evaporator 50 may alternatively be disposed outside the housing body 20. In cases in which the second evaporator 50 is disposed outside the housing body 20, a supply opening for supply of the second fluid F2 is preferably provided at a location of the housing body 20 that faces the second evaporator 50. With this configuration, the second fluid F2 can be supplied, through the supply opening, to flow paths 112 that are disposed at the condenser 40 side.

As illustrated in FIG. 3, the partitioning wall 22, the blocking portion 24, and the blocking portion 26 are disposed fixed to the housing body 20. In FIG. 3, are configured as an integral member; however, each of the partitioning wall 22, the blocking portion 24, and the blocking portion 26 may be provided as an independent member.

The partitioning wall 22 in combination with the rotary adsorption device 100 separates the interior space of the housing body 20 into the space in which the second evaporator 50 is disposed and the space in which the condenser 40 is disposed.

The partitioning wall 22 may be any partitioning wall that suppresses, to some extent, the inflow of the second fluid F2 to the space in which the condenser 40 is disposed, and that does not hinder rotation of the rotary adsorption device 100. Namely, it is not necessary that the partitioning wall 22 separate these two spaces in an airtight manner. For example, a gap of 0.1 mm or less (preferably from 0.01 mm to 0.05 mm) may be present between the partitioning wall 22 and the rotary adsorption device 100 (more specifically, the closure portion 106).

In the present embodiment, in the interior space of the housing body 20, the space in which the first evaporator 30 is disposed and the space in which the condenser 40 is disposed are separated by a part of the housing body 20 and the rotary adsorption device 100. The separation between these two spaces should be such that inflow of the first fluid F1 discharged from the first evaporator 30 into the space at the condenser 40 side is suppressed to some extent, and such that rotation of the rotary adsorption device 100 is not hindered; however, the separation between these two spaces need not be an airtight separation. For example, a gap of 0.1 mm or less (preferably from 0.01 mm to 0.05 mm) may be present between the part of the housing body 20 and a part of the rotary adsorption device 100 that together separate these two spaces.

A partition wall may be provided in the housing body 20 in order to separates the space in which the first evaporator 30 is disposed and the space in which the condenser 40 is disposed.

The blocking portion 24 is provided to face the other end in the axial direction (end at the opposite side from a side at which the second evaporator 50 is provided) of a part of the peripheral portion 104 of the rotary adsorption device 100 that is positioned at the condenser 40 side.

In the present embodiment, the blocking portion 24 blocks outflow of the second fluid F2 from the other end (end further from the second evaporator 50) of flow paths 112 positioned at the condenser 40 side. The retention of the second fluid F2 inside the flow paths 112 positioned at the condenser 40 side is thereby promoted (see FIG. 6).

The blocking portion 24 may be any blocking portion that suppresses, to some extent, the outflow of the second fluid F2 from the other end of flow paths 112 positioned at the condenser 40 side, and that does not hinder rotation of the rotary adsorption device 100. Namely, it is not necessary that the blocking portion 24 block the other end of the flow paths 112 in an airtight manner. For example, a gap of 0.1 mm or less (preferably from 0.01 mm to 0.05 mm) may be present between the blocking portion 24 and the rotary adsorption device 100 (more specifically, the closure portion 106A).

The blocking portion 26 is provided to face the one end in the axial direction (end at a side at which the second evaporator 50 is present) of a part of the peripheral portion 104 of the rotary adsorption device 100 that is positioned at the first evaporator 30 side.

In the present embodiment, the blocking portion 26 blocks outflow of the second fluid F2 from the one end (the end portion at a side at which the second evaporator 50 is present) of flow paths 112 positioned at the first evaporator 30 side. This configuration further promotes discharge of the second fluid F2 from the other end (see FIG. 7).

The blocking portion 26 may be any blocking portion that suppresses, to some extent, the outflow of the second fluid F2 from the one end of flow paths 112 positioned at the first evaporator 30 side, and that does not hinder rotation of the rotary adsorption device 100. Namely, it is not necessary that the blocking portion 26 block the one end of the flow paths 112 in an airtight manner. For example, a gap of 0.1 mm or less (preferably from 0.01 mm to 0.05 mm) may be present between the blocking portion 26 and the rotary adsorption device 100 (more specifically the closure portion 106B described later).

In the present embodiment, a configuration may be adopted in which the blocking portion 26 is not provided, and in which an interior wall of the housing body 20 is made to have the same function as that of the blocking portion 26 by making the distance between the one end of the flow paths 112 and the inner wall of the housing body 20 smaller.

In addition to the components described above, the adsorptive heat pump 10 may further include a component such as a driving device (for example, a motor or the like) for rotating the rotary adsorption device 100, a venting device for venting the interior space of the housing body 20, or a pressure measurement device for measuring the pressure in the interior space of the housing body 20.

Adsorbent Layer

Explanation next follows regarding the adsorbent layer 120 according to the present embodiment.

Adsorbent

The adsorbent layer 120 in the present embodiment includes at least one adsorbent. The adsorbent generates heat when the adsorbate (the first fluid F1 in the present embodiment; the same shall apply hereinafter) is adsorbed, and absorbs heat when the adsorbate is desorbed.

Specific examples of the adsorbent include activated carbon, mesoporous silica, zeolite, silica gel, and a clay mineral.

Of these examples, activated carbon, mesoporous silica, and a zeolite are preferable, and activated carbon and zeolite are particularly preferable.

In particular, zeolite is preferably used as the adsorbent in cases in which the adsorbate is water, and activated carbon is preferably used as the adsorbent in cases in which the adsorbate is ammonia.

The activated carbon is preferably an activated carbon having a specific surface area of from 800 m$^2$/g to 4000 m$^2$/g, more preferably from 1000 m$^2$/g to 2000 m$^2$/g, as determined by the BET method.

The mesoporous silica is preferably a mesoporous silica having a specific surface area of from 500 m$^2$/g to 1500 m$^2$/g, more preferably from 700 m$^2$/g to 1300 m$^2$/g, as determined by the BET method.

The zeolite is preferably a zeolite having a specific surface area of from 50 m$^2$/g to 1000 m$^2$/g, more preferably from 100 m$^2$/g to 1000 m$^2$/g, as determined by the BET method.

The silica gel is preferably a silica gel having a specific surface area of from 100 m$^2$/g to 1500 m$^2$/g, more preferably from 300 m$^2$/g to 1000 m$^2$/g, as determined by the BET method.

The clay mineral may be a clay mineral that is not cross-linked or a clay mineral that is cross-linked (a cross-linked clay mineral). Examples of the clay mineral include sepiolite, smectite clays (such as saponite, montmorillonite, or hectorite), tetrasilicic mica, mica, and vermiculite. Of these, sepiolite is preferable.

The filling density of the adsorbent in the adsorbent layer 120 is preferably from 0.10 g/mL to 0.80 g/mL. A filling density of 0.10 g/mL or higher enables an increase in the quantity of adsorbate (the first fluid in the present embodiment; the same shall apply hereinafter) involved in the adsorption/desorption reaction. A filling density of 0.80 g/mL or less decreases the transport resistance of the adsorbate through an adsorbent shaped body.

From the point of view of further enhancing the reactivity of the adsorption/desorption reaction, the amount of the adsorbent contained in the adsorbent layer 120 with respect to the total volume of the adsorbent layer 120 is preferably 50% by volume or more, more preferably 60% by volume or more, and particularly preferably 70% by volume or more.

The adsorbent layer 120 may include at least one fibrous thermally conductive material. The fibrous thermally conductive material may be included preferably with its axial direction intersecting with a heat transfer face (wall surface of the partitioning portion 110).

The fibrous thermally conductive material is preferably an inorganic material, and more preferably at least one type selected from the group consisting of metal fibers and carbon fibers (CF). Examples of the metal fibers include aluminum fibers and copper fibers. As the fibrous thermally conductive material, carbon fibers are particularly preferable. Of carbon fibers, carbon fibers having an aspect ratio of 10 to 500 and a fiber length of from 10 µm to 500 µm (more preferably from 100 µm to 300 µm) are particularly preferable. The thermal conductivity in the axial direction of the fibrous thermally conductive material is not particularly limited provided that it is higher than the thermal conductivity of the adsorbent. The thermal conductivity in the axial direction of the fibrous thermally conductive material may, for example, be 1.0 W/m·K or higher, and preferably 2.0 W/m·K or higher.

The amount of the thermally conductive material in the adsorbent layer 120 with respect to the total volume of the adsorbent layer 120 is preferably from 1% by volume to 30% by volume, more preferably from 1% by volume to 20% by volume, and particularly preferably from 5% by volume to 20% by volume.

The adsorbent layer 120 may include components other than those described above. Examples of other components include a binder, and a pore-forming agent. The binder preferably comprises at least one water-soluble binder.

Examples of the water-soluble binder include polyvinyl alcohol, trimethyl cellulose, and carboxy methyl cellulose (CMC). Of these examples, trimethyl cellulose is preferable.

The amount of the binder contained in the adsorbent layer 120 with respect to the total volume of the adsorbent layer 120 is preferably from 1% by volume to 5% by volume, and more preferably from 1% by volume to 2% by volume.

Methods for forming the adsorbent layer 120 on a wall surface of the partitioning portion 110 in the present embodiment is not particularly limited, and examples thereof include a method including forming an adsorbent layer by coating using a coating liquid that includes at least an adsorbent, and a method including adhering an adsorbent shaped body that includes at least an adsorbent.

Operation of Adsorption Heat Pump

Explanation next follows regarding operation of the adsorption heat pump 10. Below, description is primarily focused on a single given partitioning portion 110 of the plural partitioning portions 110.

As illustrated in FIG. 1, FIG. 2, and FIG. 4 to FIG. 7, a given partitioning portion 110 in the adsorption heat pump 10 alternately moves between the condenser 40 side and the first evaporator 30 side due to rotation of the rotary adsorption device 100 in a rotation direction R. Adsorption and desorption of the first fluid F1 is performed in each adsorbent layer 120 while the rotary adsorption device 100 rotates.

Events at the Condenser Side

Firstly, description will be given with reference to FIG. 1 and FIG. 6 of a state in which the partitioning portion 110 is positioned at the condenser 40 side.

In the partitioning portion 110 immediately after moving to the condenser 40 side (namely, prior to operation at the condenser side), the first fluid F1 has been adsorbed in the adsorbent layer 120, and the second fluid F2 has been discharged from inside the flow path 112 (see the events at the first evaporator side described later (FIG. 7)).

At the condenser 40 side, the following events occur.

As illustrated in FIG. 1, heat is supplied from the heat source (vent heat) to the second evaporator 50 via the heat medium L2 acting as a thermal energy transport medium. The second fluid F2 is thereby evaporated in the second evaporator 50, and the second fluid F2 is discharged from the second evaporator 50.

As illustrated in FIG. 6, the second fluid F2 discharged from the second evaporator 50 is supplied to the inside of the flow path 112 of the partitioning portion 110 from the one end (at a side at which the second evaporator 50 is present) of the flow path 112. When this occurs, the second fluid F2 is suppressed from ingressing into the regions D1 due to provision of the closure portion 106B at the one end side (side closer to the second evaporator 50) of the regions D1. Moreover, due to the blocking portion 24 being present at the other end side (the opposite side from a side at which the second evaporator 50 is present) of the flow path 112, discharge of the second fluid F2 from the other end side is suppressed, and the after-mentioned condensation of the second fluid F2 is performed effectively.

The second fluid F2 that has been transported to the inside of the flow path 112 condenses in the flow path 112, and adheres to and is retained by the wall surfaces of the flow path 112. The partitioning portion 110 is thereupon heated by the condensation heat (latent heat heating). The adsorbent layer 120 provided at the outer surface (on the exterior wall surface) of the partitioning portion 110 are heated by the latent heat heating, and the first fluid F1 adsorbed in the adsorbent layer 120 is desorbed. The adsorbent layer 120 is thereby regenerated.

The first fluid F1 desorbed from the adsorbent layer 120 is transported to the condenser 40, and condensed in the condenser 40. The condensation heat (hot thermal energy) that arises thereby, is transported to the outside by the heat medium L3, and used outside of the adsorptive heat pump 10 (hot thermal energy utilization).

Next, the partitioning portion 110 moves to the first evaporator 30 side due to the rotation of the rotary adsorption device 100. At the first evaporator 30 side, the following events occur.

Events at the First Evaporator Side

Explanation next follows regarding a state in which the partitioning portion 110 is positioned at the first evaporator 30 side, with reference to FIG. 1 and FIG. 7.

In the partitioning portion 110 immediately after moving to the first evaporator 30 side (prior to operation on the first evaporator side), the adsorbent layer 120 has been regenerated by the events at the evaporator side. Namely, the adsorbent layer 120 is in a state capable of adsorbing the first fluid F1. The evaporation of the first fluid F1 from the first evaporator 30 is promoted thereby. The second fluid F2 is retained in a liquid state in the flow path 112.

As illustrated in FIG. 1, the first fluid F1 is evaporated in the first evaporator 30. The first evaporator 30 is thereby cooled, and the cold thermal energy that arises due to the cooling is transported to outside the adsorption heat pump 10 by the heat medium L1 and used outside of the adsorption heat pump 10 (cold thermal energy utilization).

The first fluid F1 generated in a gaseous state from the first evaporator 30 is transported to the rotary adsorption device 100.

The transported first fluid F1 is then adsorbed by the adsorbent layer 120 of the rotary adsorption device 100 as illustrated in FIG. 7. The partitioning portion 110 is thereupon heated by the adsorption heat, and the second fluid F2 retained on the wall surfaces of the flow path 112 is evaporated. The partitioning portion 110 is then cooled by the evaporation heat (latent heat cooling), and the adsorption of the first fluid F1 by the adsorbent layer 120 is promoted by the latent heat cooling.

The evaporated second fluid F2 is discharged from the other end of the flow path 112. When this occurs, due to the closure portion 106A being provided at the other end side of the regions D1, desorption of the first fluid F1 from the adsorbent layer 120 is suppressed, and the first fluid F1 is efficiently retained by the adsorbent layer 120. Moreover, due to the presence of the blocking portion 26 at the one end side of the flow path 112, discharge of the second fluid F2 from the one end is suppressed, and venting of the second fluid F2 from the other end is promoted.

The second fluid F2 discharged from the flow path 112 is transported still in a gaseous state to the condenser 40, and condensed in the condenser 40. The condensation heat generated thereupon is transported to the outside of the adsorption heat pump 10 by the heat medium L3, and used outside the adsorption heat pump 10 (hot thermal energy utilization).

When this occurs, in the condenser 40, not only does the second fluid F2 transported from the flow path 112 at the first evaporator 30 side condense, but condensation of first fluid F1 transported from the adsorbent layer 120 at the condenser 40 side also occurs (see "Events at the Condenser Side" above).

In the present embodiment, both the first fluid F1 condensation heat and the second fluid F2 condensation heat can be obtained in the condenser 40 due to the heat supplied from the heat source (through the second evaporator 50) via the second fluid F2 acting as a thermal energy transport medium, and the heat utilization efficiency is therefore particularly excellent.

The partitioning portion 110 then returns again to the condenser 40 side due to rotation of the rotary adsorption device 100. The events described above occur again at the condenser 40 side.

The events at the condenser side (the desorption of the first fluid F1 in the adsorbent layer 120 and the condensation of the second fluid F2 in the flow path 112), and the events at the first evaporator side (the adsorption of the first fluid F1 in the adsorbent layer 120 and the evaporation of the second fluid F2 in the flow path 112), are thereby performed alternately in the given partitioning portion 110 due to rotation of the rotary adsorption device 100.

As described above, in the adsorption heat pump 10 according to the present embodiment, switching between adsorption and desorption of the first fluid F1 in the adsorbent layer 120 of the given partitioning portion 110 can be performed by the simple operation that is rotation of the rotary adsorption device 100 rather than by complicated opening and closing operations of plural valves. Such switching enables continuous operation in the given partitioning portion 110, thereby providing excellent heat utilization efficiency.

In the adsorption heat pump 10 according to the present embodiment, plural partitioning portions 110 are provided over the entire space encircling rotation axis of the rotary adsorption device 100. Therefore, the events at the condenser side and the events at the first evaporator side occur at the same time when considering the adsorption heat pump 10 as a whole. Therefore, when considering the adsorption heat pump 10 as a whole, a hot thermal energy can be obtained in the condenser 40 at the same time as obtaining a cold thermal energy in the first evaporator 30 based on heat supplied from a heater (the second evaporator 50 in the present embodiment), whereby an excellent heat utilization efficiency can be achieved.

In the adsorption heat pump 10 according to the present embodiment, switching between adsorption and desorption of the first fluid F1 by the adsorbent layer 120 is performed using the latent heat cooling and latent heat heating. Thus, compared to conventional methods that use a temperature change (sensible heat exchange) of a heat exchange fluid in the liquid state to switch between adsorption and desorption, sensible heat loss can be reduced, and the amount of second fluid F2 required to perform adsorption and desorption of the first fluid F1 can be reduced. Moreover, in comparison to such conventional methods, the efficiency of heat transfer is also excellent.

Moreover, in cases in which the first fluid F1 and the second fluid F2 are the same substance (preferably water or ammonia, or a mixture thereof, more preferably water or ammonia, and especially preferably water), problems related to the airtightness (sealing properties) between the flow path 112, through which the second fluid F2 flows, and a space through which the first fluid F1 flows (the space at the first evaporator 30 side and the space at the condenser 40 side).

In these cases, fluctuations in fluid composition caused by mixing of the first fluid F1 and the second fluid F2 in the condenser 40 are suppressed.

Accordingly, a more simple configuration of the adsorption heat pump 10 can be employed in cases in which the first fluid F1 and the second fluid F2 are the same substance.

Specific Example of Adsorption Heat Pump

For example, in a specific example with the following conditions, supply of 90° C. heat to the second evaporator 50 from a heat source (waste heat) and operation of the adsorption heat pump 10 for one minute can increase the temperature of the heat medium L3 in the condenser 40 from 25° C. to 40° C. (namely, provides a hot thermal energy of 40° C.), and decreases the temperature of the heat medium L1 in the first evaporator 30 from 25° C. to 15° C. (namely, provides a cold thermal energy of 15° C.).

Conditions

Adsorbent in adsorbent layers 120: zeolite
First fluid F1: water
Second fluid F2: water
Material of partitioning portion 110: stainless steel
Number of partitioning portions 110: twenty
Rotation speed of rotary adsorption device 100: 1 rpm The invention is not limited to the specific example described above.

In the present specific example, the heat supplied from the heat source is at 90° C. However, in the invention, the heat supplied from the heat source may be, for example, at 150° C. or lower (preferably from 80° C. to 150° C., and more preferably from 90° C. to 150° C.).

Moreover, in the present specific example, a hot thermal energy of 40° C. is obtained from the condenser 40. However, in the invention, a hot thermal energy of, for example, from 40° C. to 60° C., preferably from 40° C. to 50° C., can be obtained from the condenser.

Moreover, in the present specific example, a cold thermal energy of 15° C. is obtained from the first evaporator 30. However, in the invention, a cold thermal energy of, for example, from 5° C. to 20° C., preferably from 5° C. to 15° C., can be obtained from the first evaporator.

Moreover, the adsorbent type, the first fluid type, the second fluid type, the partitioning portion material, the number of partitioning portions, the rotation speed, and other conditions may be set as appropriate, and preferable ranges therefor are as described above.

Description is given above regarding an embodiment in which the adsorbent is provided to the outer surfaces of the partitioning portions, and in which adsorption and desorption are performed at the outer surfaces (by the adsorbent), and in which evaporation and condensation are performed in the interior of the partitioning portions (the flow paths).

However, the adsorption heat pump according to the invention may have a configuration opposite to that of the above-described embodiment, namely a configuration in which an adsorbent is provided in the interior of the partitioning portions (wall surfaces of the flow paths) but not provided to the outer surfaces of the partitioning portions, and in which evaporation and condensation are performed at the outer surfaces (outer wall surfaces) of the partitioning portions, and in which adsorption and desorption are performed in the interior of the partitioning portions (the adsorbent provided at the wall surfaces of the flow paths).

Even in this configuration, the route by which the first fluid and the second fluid are transported (namely, the route by which heat is transported) is the same as that in the embodiment described above. Therefore, switching between adsorption by the adsorbent (occurring at the condenser side in this configuration) and desorption from the adsorbent (occurring at the first evaporator side in this configuration) can be performed by a simple method that is rotation of the rotary adsorption device, thereby enabling heat utilization efficiency to be enhanced, similar to the embodiment described above.

The invention claimed is:

1. An adsorption heat pump comprising:
   a first evaporator that evaporates a first fluid;
   a condenser that condenses the first fluid;
   a heater; and
   a rotary adsorption device that is provided so as to be rotatable around a rotation axis, the rotary adsorption device including:
   a plurality of partitioning portions that radially partition a space encircling the rotation axis into a plurality of regions, that each include a flow path for internally retaining a second fluid supplied from one end of the flow path in a direction parallel to a direction of the rotation axis and discharging the second fluid from the other end of the flow path, and that each include an adsorbent on an outer surface thereof or on a wall surface of the flow path, and
   at least one pair of closure portions that close off both ends, in the direction of the rotation axis, of the plurality of regions, but do not close off both ends of the flow path,
   each of the plurality of partitioning portions being moved alternately between a first evaporator side and a condenser side by rotation of the rotary adsorption device around the rotation axis,
   the plurality of the partitioning portions including at least one first partitioning portion positioned at the first evaporator side and at least one second partitioning portion positioned at the condenser side,
   the first fluid supplied from the first evaporator being retained on an outer surface of the first partitioning portion, and the second fluid being discharged from the flow path of the first partitioning portion,
   the second fluid being retained in the flow path of the second partitioning portion, and the first fluid being discharged from an outer surface of the second partitioning portion and supplied to the condenser, and
   the heater heating the second fluid, and supplying the heated second fluid to the flow path of the second partitioning portion.

2. The adsorption heat pump of claim 1, wherein:
   the plurality of partitioning portions include an adsorbent that performs adsorption and desorption of the first fluid at the outer surfaces of the partitioning portions;
   the first fluid supplied from the first evaporator is adsorbed and retained by the adsorbent disposed at the outer surface of the first partitioning portion, and the second fluid is evaporated inside the flow path of the first partitioning portion and discharged from the flow path of the first partitioning portion; and
   the second fluid supplied from the heater is condensed in the flow path of the second partitioning portion and retained on the wall surface of the flow path of the second partitioning portion, and the first fluid is desorbed and discharged from the adsorbent disposed at the outer surface of the second partitioning portion.

3. The adsorption heat pump of claim 1, wherein the first fluid and the second fluid are the same substance.

4. The adsorption heat pump of claim 1, wherein the condenser condenses the second fluid discharged from the flow path.

5. The adsorption heat pump of claim 1, further comprising a housing body that houses the rotary adsorption device, the first evaporator, and the condenser.

6. The adsorption heat pump of claim 1, wherein the heater is a second evaporator that evaporates the second fluid and supplies the second fluid in a gaseous state into the flow path.

7. The adsorption heat pump of claim 1, further comprising a blocking portion that blocks the other end side of the flow path of the second partitioning portion.

8. The adsorption heat pump of claim 1, wherein each of the first fluid and the second fluid is water, ammonia, or a mixture of water and ammonia.

9. The adsorption heat pump of claim 1, wherein the adsorbent is at least one selected from the group consisting of activated carbon, mesoporous silica, zeolite, silica gel, and a clay mineral.

* * * * *